US006797974B2

(12) United States Patent
Philipp et al.

(10) Patent No.: US 6,797,974 B2
(45) Date of Patent: Sep. 28, 2004

(54) APPARATUS AND METHOD FOR DETERMINING BANK NOTE FITNESS

(75) Inventors: Achim Philipp, Kolbermoor (DE); Heinz Hornung, Gilching (DE)

(73) Assignee: Giesecke & Devrient, Munich (DE)

( * ) Notice: Subject to any disclaimer, the term of this patent is extended or adjusted under 35 U.S.C. 154(b) by 70 days.

(21) Appl. No.: 09/777,867

(22) Filed: Feb. 7, 2001

(65) Prior Publication Data

US 2002/0092800 A1 Jul. 18, 2002

(30) Foreign Application Priority Data

Feb. 7, 2000 (DE) ........................................ 100 05 514

(51) Int. Cl.[7] ................................................ G06K 11/00
(52) U.S. Cl. .................. 250/556; 250/559.42; 382/135
(58) Field of Search ........................... 250/559.42, 556, 250/557, 559.01, 559.16–559.18, 559.44–554.46; 356/237.1, 71, 445–448; 382/112, 135, 137

(56) References Cited

U.S. PATENT DOCUMENTS

| | | | | | |
|---|---|---|---|---|---|
| 4,352,988 | A | * | 10/1982 | Ishida | 250/559.11 |
| 4,587,434 | A | * | 5/1986 | Roes et al. | 250/556 |
| 4,723,072 | A | * | 2/1988 | Naruse | 209/534 |
| 5,304,813 | A | | 4/1994 | De Man | 250/556 |
| 5,367,577 | A | | 11/1994 | Gotaas | 382/135 |
| 5,892,239 | A | * | 4/1999 | Nagase | 250/556 |
| 6,040,584 | A | * | 3/2000 | Liu et al. | 194/207 |
| 6,061,121 | A | | 5/2000 | Holl et al. | 356/71 |
| 6,101,266 | A | * | 8/2000 | Laskowski et al. | 382/135 |
| 6,104,036 | A | * | 8/2000 | Mazowiesky | 250/556 |
| 6,241,069 | B1 | * | 6/2001 | Mazur et al. | 194/207 |

FOREIGN PATENT DOCUMENTS

| | | |
|---|---|---|
| EP | 0660277 | 6/1995 |
| EP | 0675466 | 10/1995 |
| JP | 04307693 | 10/1992 |

* cited by examiner

*Primary Examiner*—Thanh X. Luu
(74) *Attorney, Agent, or Firm*—Bacon & Thomas, PLLC

(57) ABSTRACT

An apparatus for determining the fitness of a bank note by sensing the bank note transported along a transport path by a transport device. The apparatus includes a plurality of identical sensor and illumination units positioned along each side of the transport path whereby the sensor and illumination units are focused at a single predetermined section of the transport path.

9 Claims, 2 Drawing Sheets

APPARATUS AND METHOD FOR DETERMINING BANK NOTE FITNESS

BACKGROUND OF THE INVENTION

The present invention relates to an apparatus and method for checking bank notes for their state of use, in particular for dirt and stains which can impair the service life of the bank notes.

For checking bank notes for dirt and stains, one usually illuminates the bank notes by means of at least one light source and evaluates the diffusely reflected light by means of suitable optical sensors.

However the problem arises that particularly places on the bank note which contain security features like watermarks are evaluated as stains or soiled places.

Further problems result from the fact that when a bank note is judged for its degree of soiling great effort is necessary for evaluating the signals of the sensors used since soiling or stains are felt to be especially disturbing in certain areas of the bank note, e.g. in the area of a portrait. The evaluation effort must be adapted for the whole bank note according to the critical areas and is thus especially great.

The problem of the present invention is therefore to state an apparatus and method for checking bank notes for their state of use, in particular dirt and stains which can impair the service value of the bank notes, which allow accurate judgment of the bank notes. The effort for judging the degree of soiling of the bank notes should advantageously be reduced.

SUMMARY OF THE INVENTION

The invention starts out from the consideration that two identical illumination and sensor units are disposed on both sides of a transport path for bank notes to be checked. The illumination and sensor units of both sides are disposed in such a way as to be aligned with a given place. Illumination at the same time and of the same kind from both sides avoids misjudgments in areas, e.g. in the area of the watermark. Additionally it is possible to judge the front and back of bank notes to be checked simultaneously.

One advantageously reduces the effort for judging the degree of soiling of bank notes by defining areas for the bank notes to be investigated where judgment is performed with greater effort, e.g. higher resolution, than in other areas. It has proved to be especially advantageous to fix the areas of higher resolution in accordance with the currency and/or denomination for the bank notes to be investigated.

Further advantages of the present invention can be found in the dependent claims and the following description of embodiments with reference to figures. The figures show only the components relevant for understanding the present invention. Similar components of the figures have the same reference signs.

DETAILED DESCRIPTION OF THE INVENTION

Figure 1:
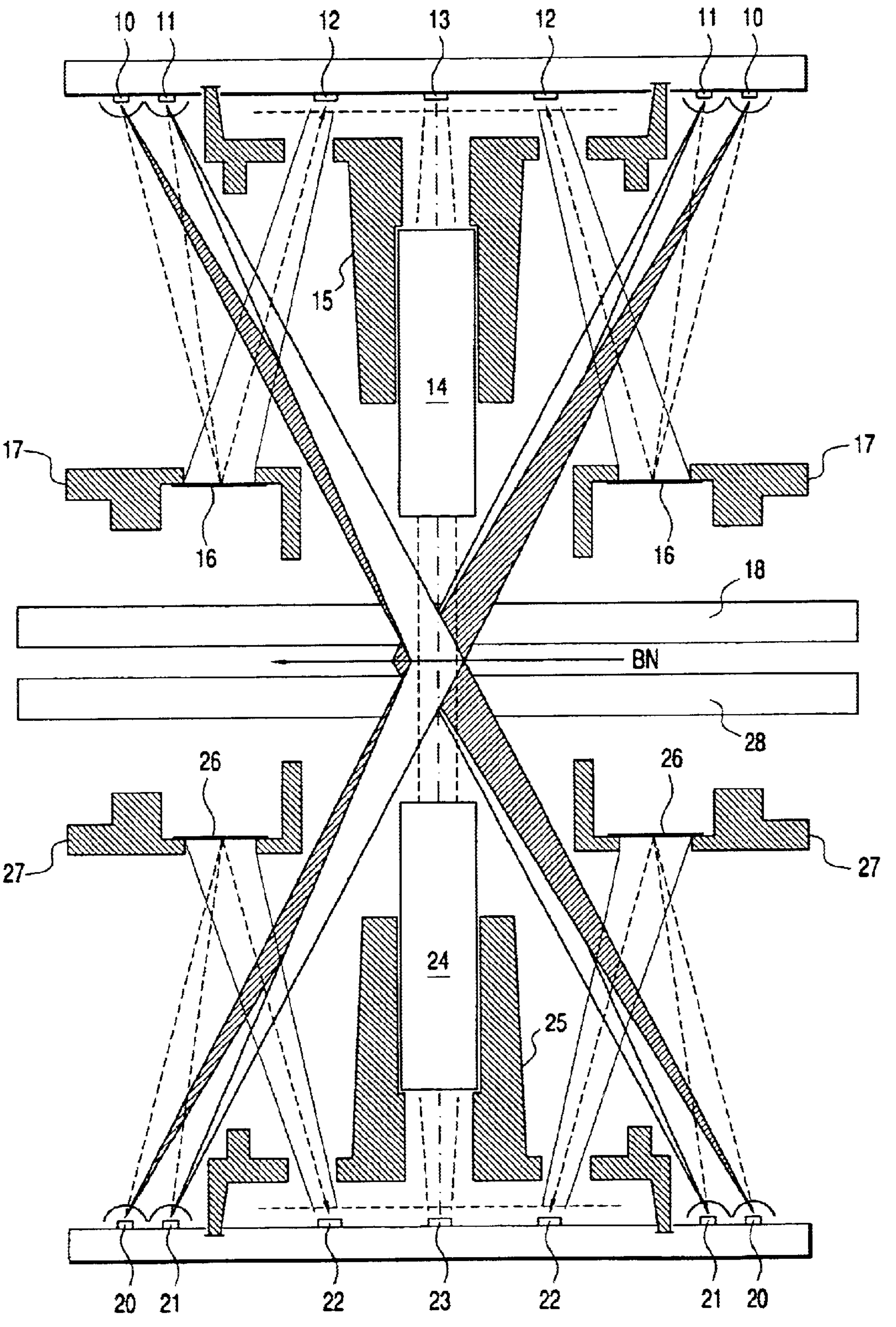
FIG. 1 shows a section parallel to the transport direction of bank notes to be checked through an apparatus for checking bank notes for their state of use.

FIG. 1 shows a section parallel to the transport direction of bank notes to be checked through an apparatus for checking bank notes for their state of use, in particular dirt and stains which can impair the service value of the bank notes.

The apparatus has illumination and sensor units of the same kind on both sides of a transport path for bank notes to be checked. The illumination and sensor units of both sides are disposed in such a way as to aligned with or focused on a given place. Illumination units 10, 11 and 20, 21 with two different wavelengths or wave ranges are provided on both sides. The illumination units can be formed by light-emitting diodes (LEDs). For example, LEDs 10 and 20 can emit white light, whereas LEDs 11 and 21 emit infrared light. In order to obtain uniform illumination, two or more LEDs can be disposed linearly for each of illumination units 10, 11 and 20, 21. The white light can be used for example for recognizing stains, whereas the infrared light can be used for judging uniform soiling extending over the total bank note. LEDs 10, 20 and 11, 21 are operated alternatingly, i.e. the LEDs with different wavelengths are operated alternately. Sensors 12 and 22 on both sides serve to control LEDs 10, 11, 20, 21 and compensate influences like aging and temperature fluctuations which can falsify judgment. For this purpose one uses the signals of sensors 12 and 22 which receive light emitted by LEDs 10, 11, 20, 21 and diffusely reflected by reference surfaces 16, 26. The properties of reference surfaces 16, 26 usually correspond to the properties of bank note paper.

Light diffusely reflected by bank note BN is received by sensors 13, 23 which can be formed by semiconductor sensors. Sensors 13 and 23 are formed by a row of semiconductor sensors or by a sensor array, the longitudinal extension of sensors 13 and 23 being greater than the extension of bank note BN to be investigated perpendicular to the transport direction. The sensors have a resolution of e.g. 1.0×1.0 mm. To improve the optical imaging one can provide lenses 14, 24 which are positioned by means of holding devices 15, 25. Especially suitable for lenses 14, 24 are lens arrays, i.e. linearly disposed gradient lenses which produce a one-to-one image of the bank notes to be investigated on sensors 13, 23. Such linearly disposed gradient lenses are known under the name SELFOC®.

Bank note BN to be investigated is transported by means of a transport unit (not shown) in the transport direction shown by an arrow through the apparatus. For protecting the sensors one can provide covers 18, 28, such as windows, which are permeable to the wave ranges used and prevent mechanical damage or dust collection on the sensors. The transport speed of the bank notes in the transport unit is selected so as to permit all-over scanning of the bank notes for the two alternating wave ranges in accordance with the resolution of sensors 13, 23.

Illumination at the same time and of the same kind from both sides with the same brightness (intensity) avoids misjudgments in areas, e.g. in the area of the watermark. Additionally it is possible to judge the front and back of bank notes to be checked simultaneously. Additionally the illumination's dependence on distance is compensated or reduced by the compensation effect of the opposite sensor and illumination units. A further improvement of judgment is possible if the soiling of windows 18, 28 is determined at times when no bank note is located in the detection area of sensors 13, 23, in order to optionally stop the apparatus if a specified threshold is exceeded and issue a request for cleaning windows 18, 28 on a display of the apparatus. For judging soiling one evaluates both the light of LEDs 10, 11, 20, 21 scattered on the dirt particles and that reflected thereby.

Figure 2:
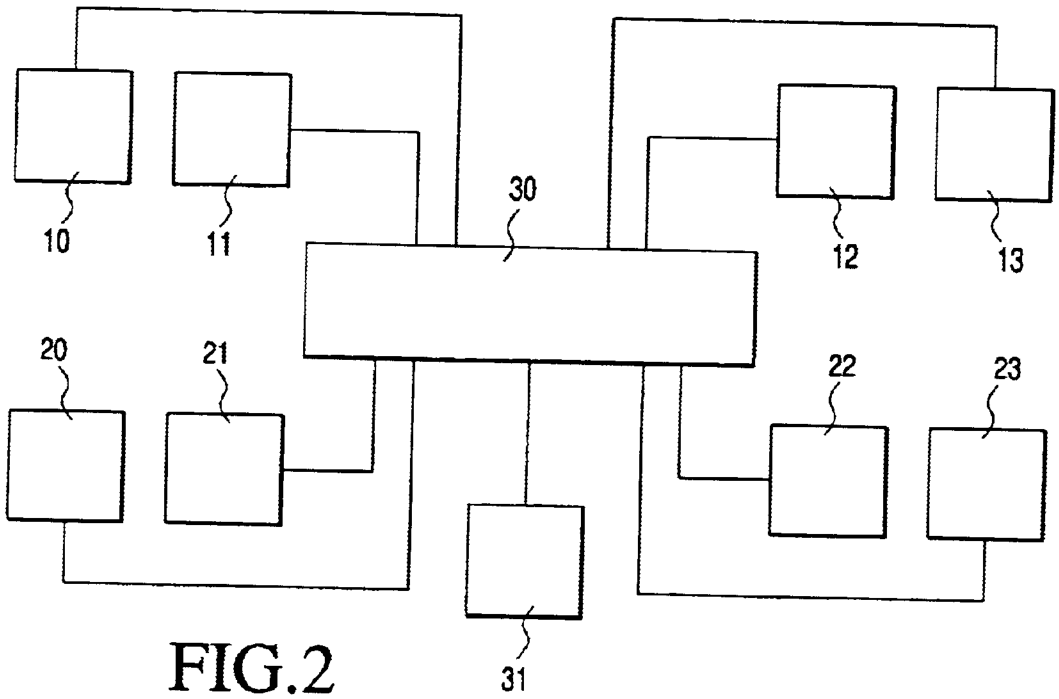
FIG. 2 shows an example for an evaluation of sensors of the apparatus for checking bank notes.

FIG. 2 shows an example for an evaluation of the sensors of the apparatus for checking bank notes and has control and evaluation unit 30, for example a micro-processor or signal processor, with associated memory 31. Microprocessor 30 evaluates signals from sensors 12, 22 and controls LEDs 10, 11, 20, 21, as described above, for controlling the illumination. Sensors 12, 22 can likewise be semiconductor sensors. Microprocessor 30 also evaluates the signals of sensors 13 and 23 for determining the soiling of the front and back of the bank note to be judged. A value for soiling can be derived from the brightness of all pixels:

$$S_i = \frac{3P_i}{P_{i-1} + P_i + P_{i+1}} - 1$$

where values $P_i$ correspond to the brightness or intensity of pixel i. Value $S_i$ must be determined for all pixels, a value for soiling then resulting from the standard deviation of all $S_i$. For reducing the computing effort it is possible to perform a simple evaluation by which one determines only values of consecutive pixels i in the transport direction, i.e. only one-dimensionally:

$$S_T = \frac{\sum_i |P_i - P_{i+1}|}{\sum_i P_i}$$

The mean value of all tracks in transport direction $S_T$ is then used as the value for soiling.

Figure 3:
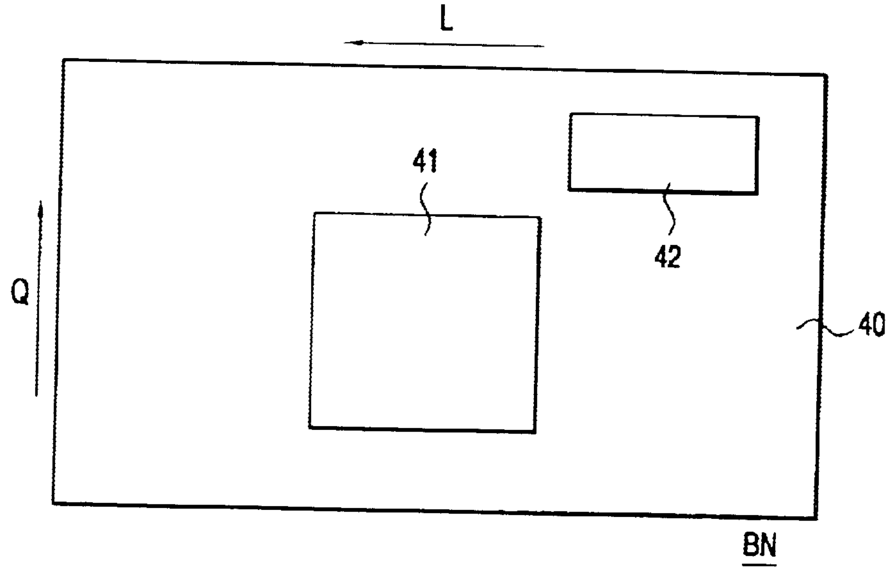
FIG. 3 shows an example for the division of a bank note into areas critical and uncritical for soiling.

FIG. 3 shows bank note BN having different areas 40, 41, 42. Area 40 corresponds to total bank note BN, area 41 corresponds to a central area containing for example a portrait, and area 42 corresponds for example to a bank note number. Such areas are advantageous because stains are especially disturbing in areas 41 and 42 for example. In areas 41 and 42 the search for stains can be effected at high resolution, e.g. at the abovementioned maximum resolution of 1.0×1.0 mm. In area 40 the evaluation can be effected at a lower resolution, e.g. 2.0×2.0 mm. For this purpose one combines the signals of two adjacent pixels of sensors 13, 23 for example. One thus obtains a resolution of 2.0×1.0 mm. Since the pixels result in the transport direction through the motion of the bank note, as described above, one ob-direction through the motion of the bank note, as described above, one obtains the resolution of 2.0×2.0 mm since two temporally successive sensor signals are combined.

Areas 40, 41, 42 can be fixed singly and stored in memory 31 of microprocessor 30 for later evaluation. They can be fixed in currency- and/or denomination-specific fashion in order to take account of the peculiarities of the particular bank notes. As shown, the areas of different resolution can overlap, e.g. areas 41, 42 are in area 40. For each of the areas one can also fix individual limiting values as of which a bank note is classified as no longer fit for circulation. This may be for example a certain number of pixels within areas 40, 41, 42 which are recognized as stained.

As further shown in FIG. 3, bank note BN can be transported both in longitudinal direction L and in transverse direction Q. It is obvious that larger sensor arrays 13, 23 and larger illumination units 10, 11, 20, 21, i.e. a larger number of linearly disposed LEDs, are required upon transport in transverse direction Q than upon transport in longitudinal direction L. At equal transport speed, a higher computing power of microprocessor 30 is in addition necessary upon transverse transport in order to permit evaluation of the sensor signals obtained.

What is claimed is:

1. An apparatus for determining the state of use of a bank note by sensing the bank note transported along a transport path by a transport device, comprising:

a plurality of identical sensor units and a plurality of illumination units, the plurality of sensor units and illumination positioned along opposite sides of the transport path and arranged so as to focus at a preselected segment of a bank note;

wherein the illumination units are positioned and configured to simultaneously illuminate directly opposed sides of the preselected segment of a bank note;

wherein the plurality of sensors are configured to detect diffusely reflected light.

2. The apparatus according to claim 1, wherein two of said illumination units are positioned on opposite sides of the transport path relative to one another and have different wavelengths or wave ranges, said two illumination units configured to operate at the same respective wavelength or wave range to illuminate the preselected segment of a bank note.

3. The apparatus according to claim 1, wherein the sensors are positioned in a linear arrangement of a plurality of individual sensor or sensor arrays positioned perpendicular to the transport path.

4. The apparatus according to claim 3, further comprising a linear arrangement of gradient lenses disposed between the sensors and the transport path to thereby produce a one-to-one image of a bank note determined by the sensors.

5. A method for determining the state of use of a bank note by sensing a bank note transported along a transport path by a transport device, comprising the steps of:

simultaneously illuminating directly opposed sides of a preselected segment of the bank note with light at a wavelength or wave range of an identical brightness or intensity; and evaluating light diffusely reflected from the preselected segment of the bank note to determine the state of use thereof.

6. The method according to claim 5, wherein the intensity of the wavelength or wave range of light illuminated the preselected segment of the bank note is alternately changed.

7. The method according to claim 6, wherein areas of the bank note are evaluated at different resolutions for determining the state of use thereof.

8. The method according to claim 7, wherein predetermined areas of a bank note of a selected currency or denomination are evaluated at different resolutions.

9. The method according to claim 5, wherein one-dimensional evaluation along a transport direction of the bank note is performed for determining the state of use of each the bank note.

* * * * *